B. Garvin & R. J. Pettibone "Pipe Joint"
75407
PATENTED
MAR 10 1868
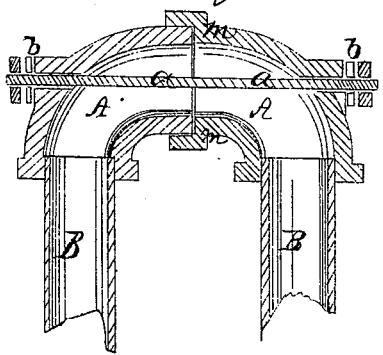
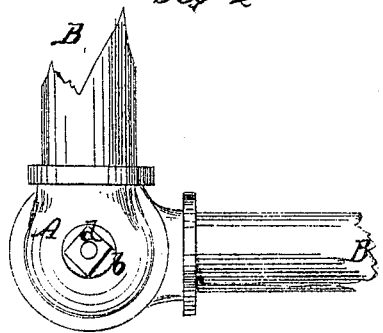
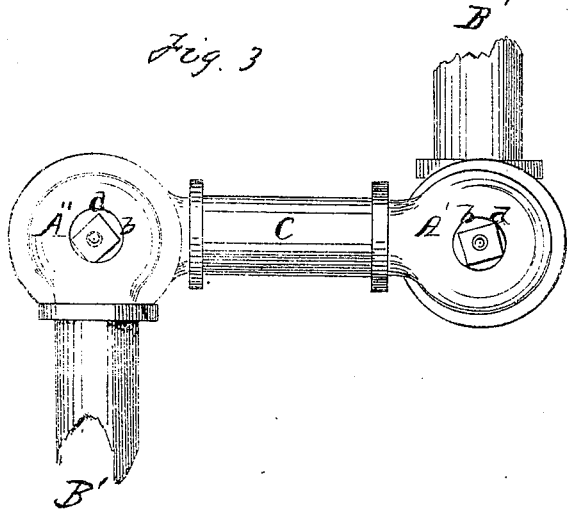
Witnesses
Theo Tusche
J. A. Fraser
Inventors
B. Garvin
R. J. Pettibone
Per
Attorneys

United States Patent Office.

BENJAMIN GARVIN AND R. J. PETTIBONE, OF OSHKOSH, WISCONSIN.

Letters Patent No. 75,407, dated March 10, 1868.

IMPROVED JOINT FOR PIPES.

*The Schedule referred to in these Letters Patent and making part of the same.*

TO ALL WHOM IT MAY CONCERN:

Be it known that we, BENJAMIN GARVIN and R. J. PETTIBONE, of Oshkosh, in the county of Winnebago, and State of Wisconsin, have invented a new and improved Joint for Steam, Water, Gas, and other Pipes; and we do hereby declare that the following is a full, clear, and exact description thereof, which will enable those skilled in the art to make and use the same, reference being had to the accompanying drawings, forming part of this specification, in which—

Figure 1 is a sectional view of our improved joint.

Figure 2 is a side view of an elbow made by turning the same at right angles.

Figure 3 is an expansion-joint obtained from the application of the principle claimed.

Similar letters of reference indicate corresponding parts.

This invention relates to the jointing of pipes for steam, water, gas, or other fluids, and consists in forming the joint in two halves, which are secured together by a single bolt, by means of which the joint can be fitted to pipes at various angles, and thereby serve a number of useful purposes.

In the drawings, A A are the halved joints; B B, the pipes, screwed or otherwise fitted into them in the usual manner. The faces of the joints are fitted together with steam-tight contact, and so held by a bolt, $a$, passing transversely through the exterior of both, as shown. This bolt can be provided with a nut and washers for securing it steam-tight, if requisite. The washer is shown at $b$, and the nut at $d$.

By means of a joint or joints formed in our improved manner, any one pipe may be removed from a system of pipes, and another replaced, without interfering with the remainder. The same joint will answer for forming an elbow, as shown at fig. 2, or changing the direction of pipes by any desired angle. The same principle permits the construction of a superior expansion-joint, as shown at fig. 3, where B and B' are the pipes for which an expansive allowance is to be provided.

C is a short expansion-pipe, which is provided with halved parts A' of joints, and these halved parts are fitted and bolted to corresponding halved parts A'' on the pipes B' B', as shown, whereby the longitudinal expansion of the said pipes is permitted. This expansion-joint is claimed to be superior to the ordinary slip-joint, as heretofore used.

Return-joints can be made for any angle, and pipes can be set so as to form a coil by setting the halved parts at the required angle and screwing the nut tight. To secure a tighter joint, one of the parts should be enlarged so as to form an interior shoulder, as shown at $m$ in fig. 1, into which the other part fits.

Heretofore the joints of any system of pipes were cast whole and the pipe fitted thereto. This construction necessitated the employment of joints made for the particular angle required, and involved more or less difficulty in fitting the same. Our improvements obviate these objectionable features, and provide a joint equally applicable to any required angle, thus reducing the expense of jointing pipes. The joints can be produced at a cheaper rate than the ones above cited in comparison, and are not more liable to leak or get out of repair than any other joints.

It will be seen that the bolt is not cast with the parts, and, being held in place by the nut and washer at one outer end, and by the head of the bolt at the other, can be easily and readily withdrawn at any time. It often may become necessary to withdraw the bolt for various purposes; hence it is observed that this device possesses advantages over those not provided with movable bolts, or those couplings where obstructions are inserted within the pipe.

We claim as new, and desire to secure by Letters Patent—

The parts A A, constructed as specified, and used with the bolt $a$, which said bolt passes transversely through both of said parts, and is suitably secured on both of their outer sides, by nuts and washers, or their equivalents, as set forth.

The above specification of our invention signed by us, this 29th day of October, 1867.

BENJ. GARVIN,
R. J. PETTIBONE.

Witnesses:
H. STROUD,
A. FORD.